United States Patent
Hohwald et al.

(10) Patent No.: US 10,949,770 B2
(45) Date of Patent: Mar. 16, 2021

(54) IDENTIFICATION OF SYNTHETIC EXAMPLES FOR IMPROVING SEARCH RANKINGS

(71) Applicant: SHUTTERSTOCK, INC., New York, NY (US)

(72) Inventors: Heath Hohwald, Logrono (ES); Manor Lev-Tov, Brooklyn, NY (US)

(73) Assignee: Shutterstock, Inc., New York, NY (US)

( * ) Notice: Subject to any disclaimer, the term of this patent is extended or adjusted under 35 U.S.C. 154(b) by 978 days.

(21) Appl. No.: 15/009,037

(22) Filed: Jan. 28, 2016

(65) Prior Publication Data
US 2017/0220575 A1    Aug. 3, 2017

(51) Int. Cl.
*G06F 17/30* (2006.01)
*G06N 99/00* (2019.01)
*G06N 20/00* (2019.01)
*G06N 3/04* (2006.01)
*G06F 16/435* (2019.01)

(52) U.S. Cl.
CPC .......... *G06N 20/00* (2019.01); *G06F 16/435* (2019.01); *G06N 3/0454* (2013.01)

(58) Field of Classification Search
CPC .... G06N 99/005; G06N 20/00; G06N 3/0454; G06F 16/435
See application file for complete search history.

(56) References Cited

U.S. PATENT DOCUMENTS

| | | | | |
|---|---|---|---|---|
| 8,131,786 B1 * | 3/2012 | Bengio | ............. | G06F 17/30244 707/732 |
| 8,856,051 B1 * | 10/2014 | Song | ...................... | G06N 20/00 706/12 |
| 8,923,655 B1 * | 12/2014 | Weston | ............. | G06F 17/30274 382/115 |
| 8,924,993 B1 * | 12/2014 | Niebles Duque | .. | G06K 9/00744 725/9 |

(Continued)

OTHER PUBLICATIONS

Natsev, Apostol, Milind R. Naphade, and Jelena Tešić. "Learning the semantics of multimedia queries and concepts from a small number of examples." Proceedings of the 13th annual ACM international conference on Multimedia. 2005. (Year: 2005).*

*Primary Examiner* — Usmaan Saeed
*Assistant Examiner* — William P Bartlett
(74) *Attorney, Agent, or Firm* — McDermott Will & Emery LLP

(57) ABSTRACT

Methods, systems, and machine-readable media for identifying synthetic media file examples to train a supervised machine learned ranking algorithm to rank relevance of media files to a search query are provided. In one aspect, a method includes identifying a search query for a search engine for a collection of media files from previously received search queries, and selecting at least one training media file from the collection as a synthetic negative example for the search query. The method also includes providing a training set to a supervised machine learned ranking algorithm. The training set includes an identification of the search query, a copy of the training media file, and a (Continued)

first indicator that the training media file is a synthetic negative example for the search query. The method further includes providing, to the algorithm, the search query and the collection, and receiving, from the algorithm, a ranking of the collection.

18 Claims, 7 Drawing Sheets

(56) References Cited

U.S. PATENT DOCUMENTS

| | | | |
|---|---|---|---|
| 2008/0270478 A1* | 10/2008 | Liu | G06F 16/583 |
| 2014/0105488 A1* | 4/2014 | Geng | G06K 9/6265 |
| | | | 382/161 |
| 2016/0070953 A1* | 3/2016 | Yamaji | G06K 9/00684 |
| | | | 382/118 |
| 2016/0335263 A1* | 11/2016 | Yin | G06F 17/3053 |
| 2016/0379132 A1* | 12/2016 | Jin | G06N 99/005 |
| | | | 706/12 |

* cited by examiner ically, items from a repository that are likely to be responsive to a search query. An actual positive example for a search query is, for example, an item from a repository that was previously selected or otherwise downloaded in response to the search query.

IDENTIFICATION OF SYNTHETIC EXAMPLES FOR IMPROVING SEARCH RANKINGS

BACKGROUND

Field

The present disclosure generally relates to identifying data files as synthetic negative examples and synthetic positive examples for a search query to provide to a supervised machine learned ranking algorithm for training in order to generate a ranking model to assist with identifying a likelihood of relevance of another data file to the search query.

Description of the Related Art

Online content repositories commonly provide users with the ability to search for and access content in the repositories. For example, for an online media content repository with a large volume of images and videos, a user that seeks to search for a particular image of cats may enter the query "cat" into a search interface of a search engine for the online image content repository. Search results that are identified as responsive to an image search query are commonly provided by a machine learned ranking algorithm. Such machine learned ranking algorithms for search engines that search repositories of information are commonly trained by providing actual positive examples for search queries to the machine learned ranking algorithm so that a ranking model can be generated to identify, based on the actual positive examples, items from a repository that are likely to be responsive to a search query. An actual positive example for a search query is, for example, an item from a repository that was previously selected or otherwise downloaded in response to the search query.

SUMMARY

The disclosed system provides for identifying, among a collection of media files, synthetic negative examples for a search query. In certain aspects, synthetic positive examples for the search query may also be identified from the collection of media files. The synthetic negative examples and optionally the synthetic positive examples for the search query can be provided to a supervised machine learned ranking algorithm in order to train the supervised machine learned ranking algorithm to generate a ranking model that can identify, for each media file in the collection of media files, a likelihood of relevance of the media file to the search query.

According to one embodiment of the present disclosure, a computer-implemented method for identifying synthetic media file examples to train a supervised machine learned ranking algorithm to rank relevance of media files to a search query is provided. The method includes identifying a search query for a search engine for a collection of media files from a plurality of previously received search queries for the search engine, and selecting at least one training media file from the collection of media files as a synthetic negative example for the search query. The method also includes providing, to a supervised machine learned ranking algorithm in order to generate a ranking model that provides a probability that a media file is responsive to the search query, a training set. The training set includes an identification of the search query, a copy of the at least one training media file, and a first indicator that the training media file is a synthetic negative example for the search query. The method further includes providing, to the supervised machine learned ranking algorithm, the search query and the collection of media files, and receiving, from the supervised machine learned ranking algorithm, a ranking of the collection of media files according to a probability that each media file in the collection is responsive to the search query.

In certain aspects of the method, the ranking model is a logistic regression model. In certain aspects of the method, the identifying the search query includes selecting the search query at random from the plurality of previously received search queries for the search engine, and selecting the at least one training media file from the collection of media files as the synthetic negative example for the search query includes selecting at random the at least one training media file from the collection of media files and designating the at least one training media file as a synthetic negative example. In these aspects, the collection of training media files excludes files that have been previously downloaded for the search query. In certain aspects of the method, selecting the at least one training media file from the collection of media files as the synthetic negative example for the search query includes identifying a plurality of media files comprising the at least one training media file that were previously displayed on screen to a user in response to the search query, and determining that the at least one training media file was not engaged with by the user when the at least one training media file was previously displayed on screen to the user in response to the search query.

In certain aspects of the method, selecting the at least one training media file from the collection of media files as the synthetic negative example for the search query includes identifying at least one positive example media file for the search query, determining a visual similarity threshold value to indicate whether another media file is visually similar to the at least one positive example media file, and designating the at least one training media file from the collection of media files as the synthetic negative example for the search query when a visual similarity value for the at least one training media file does not exceed the visual similarity threshold value. In these aspects, the method can further include selecting at least another training media file from the collection of media files as a synthetic positive example for the search query, wherein the training set further includes a copy of the at least another training media file selected as the synthetic positive example for the search query and a second indicator that the at least another training media file is a synthetic positive example for the search query. In these aspects, selecting the at least another training media file from the collection of media files as a synthetic positive example for the search query includes designate the at least another training media file from the collection of media files as the synthetic positive example for the search query when a visual similarity value for the at least another training media file exceeds the visual similarity threshold value. In these aspects, the at least one training media file and the at least another training media file have not previously been downloaded by a user in response to the search query. In certain aspects, the visual similarity threshold value is determined based on a visual similarity value calculated from a comparison of a first set of media files downloaded for the search query during a first period of time to a second set of media files different than the first set of media files that were downloaded for the search query during a second period of time. In certain aspects, the visual similarity threshold value is determined based on a number of downloads of media files for the search query.

In certain aspects of the method, the method further includes dividing the collection of the media files into a plurality of clusters based on a similarity threshold, determining, for the search query, how many downloads occurred for the search query from each of the plurality of clusters of media files, and selecting the at least one training media file as the synthetic negative example for the search query at random from media files in one of the plurality of clusters of media files having a download count below a download frequency threshold value. In these aspects, the method can further include selecting at least another training media file from the collection of media files as a synthetic positive example for the search query by selecting the at least another training media file at random from media files in another of the plurality of clusters of media files having a download count exceeding a download frequency threshold value, wherein the training set further includes a copy of the at least another training media file selected as the synthetic positive example for the search query and a second indicator that the at least another training media file is a synthetic positive example for the search query.

According to one embodiment of the present disclosure, a system for identifying synthetic media file examples to train a supervised machine learned ranking algorithm to rank relevance of media files to a search query is provided. The system includes a memory that includes a supervised machine learned ranking algorithm, and a collection of media files. The system also includes a processor. The processor is configured to execute instructions to identify a search query for a search engine for the collection of media files from a plurality of previously received search queries for the search engine, and select at least one training media file from the collection of media files as a synthetic negative example for the search query. The processor is also configured to execute instructions to select at least another training media file from the collection of media files as a synthetic positive example for the search query, and provide, to the supervised machine learned ranking algorithm in order to generate a logistic regression model that provides a probability that a media file is responsive to the search query, a training set. The training set includes an identification of the search query, a copy of the at least one training media file, a first indicator that the training media file is a synthetic negative example for the search query, a copy of the at least another training media file selected as the synthetic positive example for the search query, and a second indicator that the at least another training media file is a synthetic positive example for the search query. The processor is also configured to execute instructions to provide, to the supervised machine learned ranking algorithm, the search query and the collection of media files, and receive, from the supervised machine learned ranking algorithm, a ranking of the collection of media files according to a probability that each media file in the collection is responsive to the search query.

In certain aspects of the system, the processor being configured to identify the search query includes the processor being configured to select the search query at random from the plurality of previously received search queries for the search engine, the processor being configured to select the at least one training media file from the collection of media files as the synthetic negative example for the search query includes the processor being configured to select at random the at least one training media file from the collection of media files and designating the at least one training media file as a synthetic negative example, and the collection of training media files excludes files that have been previously downloaded for the search query. In certain aspects of the system, the processor being configured to select the at least one training media file from the collection of media files as the synthetic negative example for the search query includes the processor being configured to identify a plurality of media files comprising the at least one training media file that were previously displayed on screen to a user in response to the search query, and determine that the at least one training media file was not engaged with by the user when the at least one training media file was previously displayed on screen to the user in response to the search query.

In certain aspects of the system, the processor being configured to select the at least one training media file from the collection of media files as the synthetic negative example for the search query includes the processor being configured to identify at least one positive example media file for the search query, determine a visual similarity threshold value to indicate whether another media file is visually similar to the at least one positive example media file, and designate the at least one training media file from the collection of media files as the synthetic negative example for the search query when a visual similarity value for the at least one training media file does not exceed the visual similarity threshold value, wherein the processor being configured to select the at least another training media file from the collection of media files as the synthetic positive example for the search query includes the processor being configured to designate the at least another training media file from the collection of media files as the synthetic positive example for the search query when a visual similarity value for the at least another training media file exceeds the visual similarity threshold value, and wherein the at least one training media file and the at least another training media file have not previously been downloaded by a user in response to the search query. In these aspects, the visual similarity threshold value can be determined based on at least one of a visual similarity value calculated from a comparison of a first set of media files downloaded for the search query during a first period of time to a second set of media files different than the first set of media files that were downloaded for the search query during a second period of time, or a number of downloads of media files for the search query.

In certain aspects of the system, the processor is further configured to divide the collection of the media files into a plurality of clusters based on a similarity threshold, determine, for the search query, how many downloads occurred for the search query from each of the plurality of clusters of media files, select the at least one training media file as the synthetic negative example for the search query at random from media files in one of the plurality of clusters of media files having a download count below a download frequency threshold value, and select the at least another training media file as the synthetic positive example for the search query at random from media files in another of the plurality of clusters of media files having a download count exceeding a download frequency threshold value.

According to one embodiment of the present disclosure, a non-transitory machine-readable storage medium comprising machine-readable instructions for causing a processor to execute a method for identifying synthetic media file examples to train a supervised machine learned ranking algorithm to rank relevance of media files to a search query is provided. The method includes identifying a search query for a search engine for a collection of media files from a plurality of previously received search queries for the search engine, and selecting at least one training media file from the collection of media files as a synthetic negative example for the search query. The method also includes selecting at least another training media file from the collection of media files as a synthetic positive example for the search query, and providing a training set to a supervised machine learned ranking algorithm in order to generate a logistic regression model that provides a probability that a media file is responsive to the search query. The training set includes an identification of the search query, a copy of the at least one training media file, a first indicator that the training media file is a synthetic negative example for the search query, a copy of the at least another training media file selected as the synthetic positive example for the search query, and a second indicator that the at least another training media file is a synthetic positive example for the search query. The method further includes providing, to the supervised machine learned ranking algorithm, the search query and the collection of media files, and receiving, from the supervised machine learned ranking algorithm, a ranking of the collection of media files according to a probability that each media file in the collection is responsive to the search query.

According to one embodiment of the present disclosure, a system for identifying synthetic media file examples to train a supervised machine learned ranking algorithm to rank relevance of media files to a search query is provided. The system includes means for identifying a search query for a search engine for a collection of media files from a plurality of previously received search queries for the search engine, the means for identifying further being configured for selecting at least one training media file from the collection of media files as a synthetic negative example for the search query. The means for identifying is further configured for providing, to a supervised machine learned ranking algorithm in order to generate a ranking model that provides a probability that a media file is responsive to the search query, a training set. The training set includes an identification of the search query, a copy of the at least one training media file, and a first indicator that the training media file is a synthetic negative example for the search query. The means for identifying is further configured for providing, to the supervised machine learned ranking algorithm, the search query and the collection of media files, and for receiving, from the supervised machine learned ranking algorithm, a ranking of the collection of media files according to a probability that each media file in the collection is responsive to the search query. The system also includes means for providing the ranking of the collection to another device.

In certain aspects of the system, the ranking model is a logistic regression model. In certain aspects of the system, the identifying the search query includes selecting the search query at random from the plurality of previously received search queries for the search engine, and selecting the at least one training media file from the collection of media files as the synthetic negative example for the search query includes selecting at random the at least one training media file from the collection of media files and designating the at least one training media file as a synthetic negative example. In these aspects, the collection of training media files excludes files that have been previously downloaded for the search query. In certain aspects of the system, selecting the at least one training media file from the collection of media files as the synthetic negative example for the search query includes identifying a plurality of media files comprising the at least one training media file that were previously displayed on screen to a user in response to the search query, and determining that the at least one training media file was not engaged with by the user when the at least one training media file was previously displayed on screen to the user in response to the search query.

In certain aspects of the system, selecting the at least one training media file from the collection of media files as the synthetic negative example for the search query includes identifying at least one positive example media file for the search query, determining a visual similarity threshold value to indicate whether another media file is visually similar to the at least one positive example media file, and designating the at least one training media file from the collection of media files as the synthetic negative example for the search query when a visual similarity value for the at least one training media file does not exceed the visual similarity threshold value. In these aspects, the means for identifying is further configured for selecting at least another training media file from the collection of media files as a synthetic positive example for the search query, wherein the training set further includes a copy of the at least another training media file selected as the synthetic positive example for the search query and a second indicator that the at least another training media file is a synthetic positive example for the search query. In these aspects, selecting the at least another training media file from the collection of media files as a synthetic positive example for the search query includes designate the at least another training media file from the collection of media files as the synthetic positive example for the search query when a visual similarity value for the at least another training media file exceeds the visual similarity threshold value. In these aspects, the at least one training media file and the at least another training media file have not previously been downloaded by a user in response to the search query. In certain aspects, the visual similarity threshold value is determined based on a visual similarity value calculated from a comparison of a first set of media files downloaded for the search query during a first period of time to a second set of media files different than the first set of media files that were downloaded for the search query during a second period of time. In certain aspects, the visual similarity threshold value is determined based on a number of downloads of media files for the search query.

In certain aspects of the system, the means for identifying is further configured for dividing the collection of the media files into a plurality of clusters based on a similarity threshold, determining, for the search query, how many downloads occurred for the search query from each of the plurality of clusters of media files, and selecting the at least one training media file as the synthetic negative example for the search query at random from media files in one of the plurality of clusters of media files having a download count below a download frequency threshold value. In these aspects, means for identifying is further configured for selecting at least another training media file from the collection of media files as a synthetic positive example for the search query by selecting the at least another training media file at random from media files in another of the plurality of clusters of media files having a download count exceeding a download frequency threshold value, wherein the training set further includes a copy of the at least another training media file selected as the synthetic positive example for the search query and a second indicator that the at least another training media file is a synthetic positive example for the search query.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
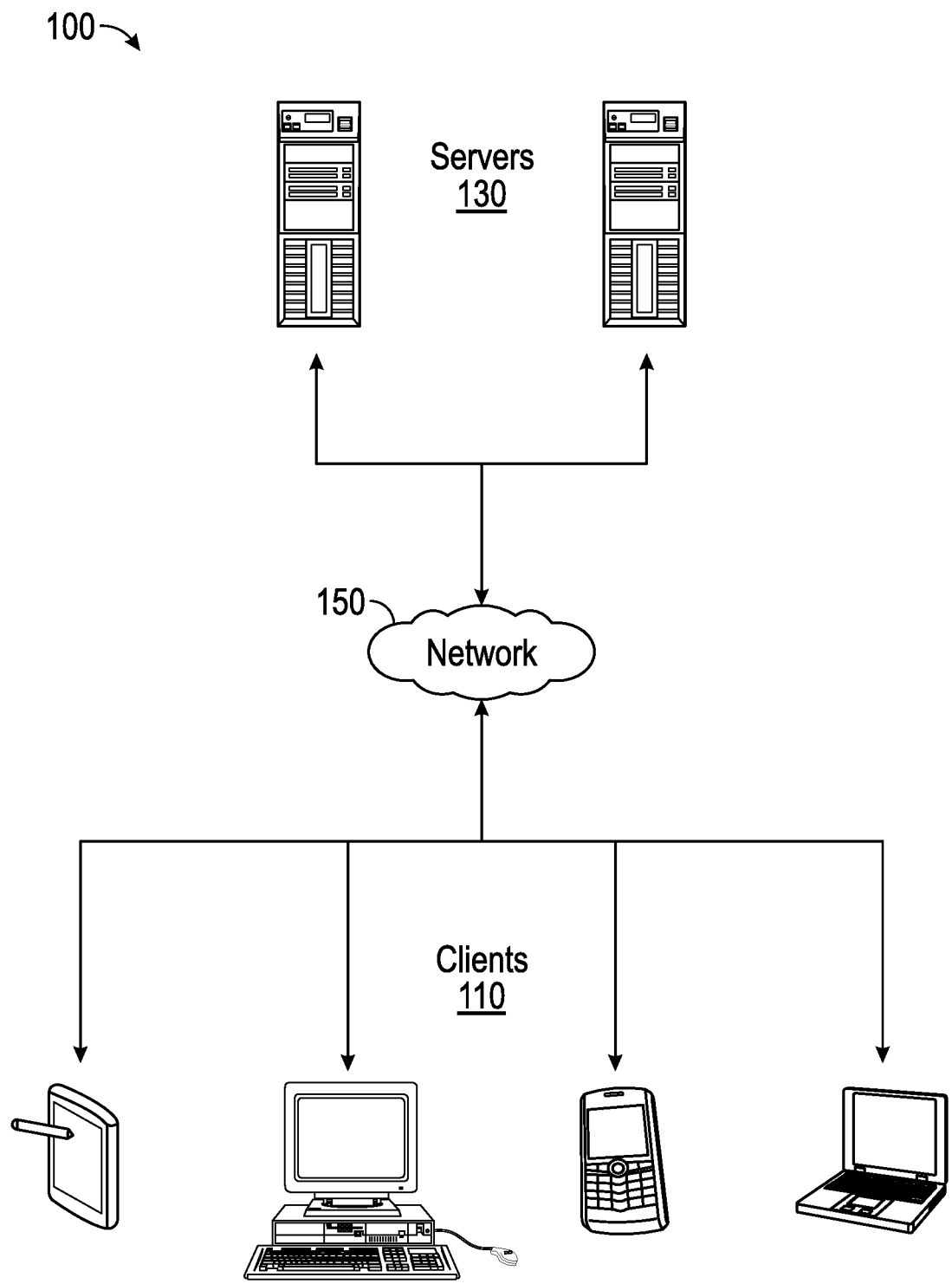
FIG. 1 illustrates an example architecture for identifying synthetic media file examples to train a supervised machine learned ranking algorithm to rank relevance of media files to a search query.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system describes various approaches for identifying synthetic (e.g., predicted) negative media file examples for a search query and synthetic positive media file examples for a search query so that the synthetic negative examples, and optionally synthetic positive examples, along with a related search query can be provided to a supervised machine learned ranking algorithm in order to facilitate the generation of a more accurate ranking model for the search query by the machine learned ranking algorithm. The more accurate ranking model is configured to provide a probability that a media file from a collection of media files is responsive to the search query.

As discussed herein, a synthetic media file example for a search query is a media file that is selected without reference to any associated data for the media file indicating whether the media file is responsive or not responsive to the search query, such as whether the media file has been downloaded or otherwise engaged with in response to the search query. Thus, a synthetic positive media file example is a media file that is identified as likely being responsive to a search query, and a synthetic negative media file example is a media file that is identified as not likely being responsive to the search query. As discussed herein, an actual media file example for a search query, on the other hand, is a media file that was previously selected as responsive to the search query, such as where the media file was previously downloaded or otherwise engaged with in response to the search query. Engagement of a user with a media file can include, but is not limited to, downloading of the media file, selection of the media file, editing of the media file, or interaction with the media file using an input device. Although the examples discussed herein refer to a downloading of a media file as indicating a positive engagement with a media file, other examples of engagements are contemplated as noted above, including selection of the media file, editing of the media file, or interaction with the media file using an input device.

Synthetic negative examples for a search query can be identified, for example, by selecting at random a media file from the collection of media files and designating that media file as a synthetic negative example for the search query. This is appropriate because for a large collection of media files it is highly likely that the selected media file is not related to the search query. Synthetic negative examples for a search query can also be identified, for example, by identifying several media files that were previously displayed on screen to a user in response to the search query, and designating one of the media files as a synthetic negative example if it not engaged with by the user when it was displayed on screen to the user.

Synthetic negative examples for a search query can also be identified, for example, by identifying at least one positive example media file for the search query (e.g., a media file that was previously downloaded in response to the search query), determining a visual similarity threshold value indicative of how visually similar another media file must be to the positive example media file to be considered a positive example, and designating another media file from the collection as a synthetic negative example for the search query when the visual similarity value for the other media file does not exceed the visual similarity threshold value. Similarly, a media file from the collection can be designated as a synthetic positive example for the search query when a visual similarity value for the media file exceeds the visual similarity threshold value.

Synthetic negative examples for a search query can further be identified, for example, by dividing the collection of the media files into a plurality of clusters based on a similarity threshold using a clustering algorithm, determining, for the search query, how many downloads occurred for the search query from each of the clusters, and designating a random media file as a synthetic negative example for the search query in one of the clusters that has a download count below a download frequency threshold value (e.g., from any cluster for media files that were downloaded less than 1% of the time in the past for the search query).

The disclosed system addresses the technical problem of generating a more accurate ranking model by a machine learned ranking algorithm for media files responsive to search queries, which is a technical problem tied to computer technology because it addresses a problem specific to supervised machine learned ranking algorithms. The technical solution is necessarily rooted in computer technology in order to overcome the technical problem tied to computer technology because the solution provides for the identification of synthetic media file examples with which the supervised machine learned ranking algorithm can be better trained. As a result of the technical solution, the more accurate ranking model generated by the machine learned ranking algorithm using the synthetic examples can be advantageously used for the particular useful application of providing more accurate probabilities that a media file from a collection of media files is responsive to a search query.

FIG. 1 illustrates an example architecture for identifying synthetic media file examples to train a supervised machine learned ranking algorithm to rank relevance of media files to a search query. The architecture 100 includes servers 130 and clients 110 connected over a network 150.

One of the many servers 130 is configured to host software for a search engine and for processing a supervised machine learned ranking algorithm for generating a ranking model for a collection of media files to be searched by the search engine. For purposes of load balancing, multiple servers 130 can host the search engine, the collection of media files, and the supervised machine learned ranking algorithm.

The disclosed system provides for the identification of synthetic media file examples from a collection of media files to provide to a supervised machine learned ranking algorithm for a search query so that the supervised machine learned ranking algorithm can generate a more accurate ranking model for the search query than if the supervised machine learned ranking algorithm were provided with just actual positive examples for the search query. This can be done for multiple search queries so that when the search engine receives a search query to search the collection of media files, the more accurate ranking model can more accurately rank the media files in the collection according to the responsiveness of those media files to the search query.

The synthetic media file examples include synthetic negative examples and optionally synthetic positive examples that are identifiable according to various approaches including random selection of media files from the collection that are then designated as synthetic negative examples, and designating media files from the collection displayed to but not interacted with by a user in response to a search query as synthetic negative examples for the search query. The various approaches also include using a distance calculation to generate a similarity threshold value for a search query based on actual positive media file examples for the search query identified from past interaction action data, and then designating media files from the collection as either synthetic positive examples or synthetic negative examples based on comparison of the similarity value for each of the media files (calculated using the distance calculation) to the distance threshold. The various approaches further include clustering media files in the collection according to similarity (e.g., visual similarity, conceptual similarity, keyword similarity, etc.) using a clustering algorithm, determining how many past user interactions occurred for a search query from a cluster, designating a randomly selected media file from a cluster having a sufficiently low level of user interaction for the search query as a synthetic negative example, and designating a randomly selected media file from a cluster having a sufficiently high level of user interaction for the search query as a synthetic positive example.

The servers 130 can be any device having an appropriate processor, memory, and communications capability for hosting software for the search engine and for processing the supervised machine learned ranking algorithm for generating the ranking model for the collection of media files to be searched by the search engine. The media files identified as responsive to a search query submitted to the search engine using one of the clients 110 to which the servers 130 are connected over the network 150 and ranked by the ranking model can be displayed by the respective clients 110. The clients 110 can be, for example, desktop computers, mobile computers, tablet computers (e.g., including e-book readers), mobile devices (e.g., a smartphone or PDA), or any other devices having appropriate processor, memory, and communications capabilities for submitting a search query to the disclosed search engine on one of the servers 130 and displaying media file results responsive to the search query and provided by one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
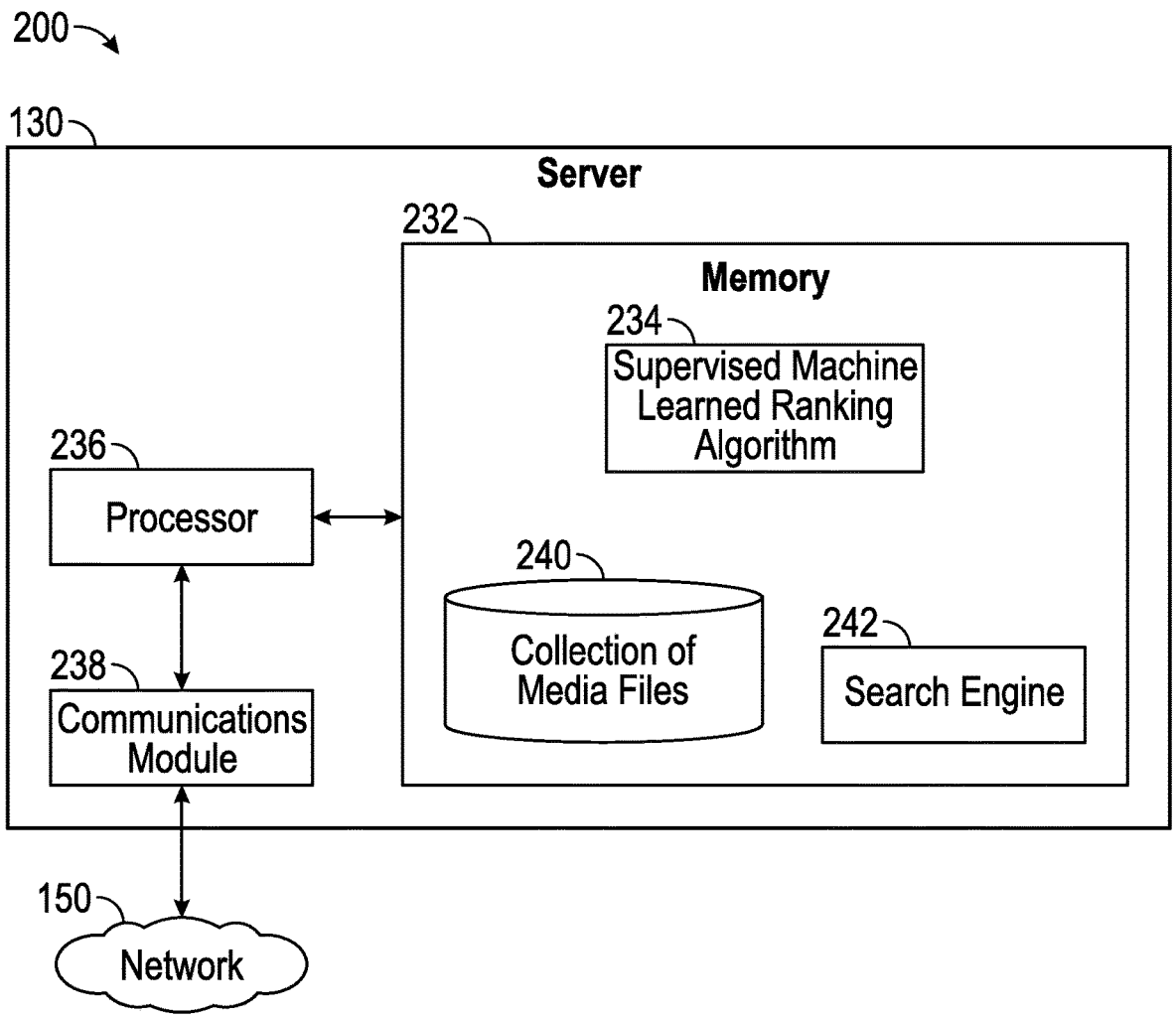
FIG. 2 is a block diagram illustrating an example server from the architecture of FIG. 1 according to certain aspects of the disclosure.

FIG. 2 is a block diagram illustrating an example server 130 in the architecture 100 of FIG. 1 according to certain aspects of the disclosure. The server 130 includes a processor 236, a communications module 238, and a memory 232 that includes a supervised machine learned ranking algorithm 234, a collection of media files 240, and a search engine 242.

As discussed herein, the supervised machine learned ranking algorithm 234 is a computer algorithm for the machine learning task of inferring a function from labeled training data. The training data includes a set of training examples as will be discussed in further detail below. In certain aspects, each example is a pair consisting of an input object (e.g., a synthetic media file example and a search query) and a desired output value, such as an indicator as to whether the synthetic media file example is a negative example or a positive example. In certain aspects, the input can be a number of features of a media file, such as an age of the media file, what region the media file was downloaded in, keywords associated with the media file, and a query term. The supervised machine learned ranking algorithm analyzes the training data and produces an inferred function, such as a ranking model, which can be used for mapping new examples (e.g., determining a probability of responsiveness of a newly provided media file to the search query). In certain aspects, the ranking model is a logistic regression model. Other algorithms can also be used, as can a neural network.

The server 130 is connected to a network 150 via a communications module 238. The communications module 238 is configured to interface with the network 150 to send and receive information, such as data, requests, responses, and commands to other devices on the network. For example, the communications module 238 is configured to receive a search query for the search engine 242 to search the collection of media files 240, and to return a listing (e.g., via a network address to a web page) of media files from the collection of media files 240 that is responsive to the search query. The communications module 238 can be, for example, modems or Ethernet cards.

The processor 236 of the server 130 is configured to execute instructions, such as instructions physically coded into the processor 236, instructions received from software in memory 240, or a combination of both. For example, the processor 236 of the server 130 executes instructions for identifying synthetic media file examples to train the supervised machine learned ranking algorithm 234 to rank relevance of media files in the collection of media files 240 to a search query. In this regard, the processor 236 is configured to identify a search query for the search engine 242 for the collection of media files 240 from previously received search queries for the search engine 242. The previously received search queries for the search engine 242 can be stored in the memory 232 of the server 130 (not illustrated). Example search queries include one word or a combination of words and characters, for example, "cat", "2 cats together", and "brown cats in a tree".

The processor 236 is configured to select at least one training media file from the collection of media files 240 and designate the training media file as a synthetic negative example for the identified search query.

As a first approach, the training media file can be identified for designation as a synthetic negative example for a search query by, for example, selecting the search query as a random search query from the previously received search queries for the search engine, and selecting at random a media file from the collection of media files 240 as the training media file and designating the randomly selected media file as a synthetic negative example. This approach is based on an understanding that for a large enough collection of media files 240, by randomly selecting a previously received search query and randomly selected a media file from the collection 240 and designating the randomly selected media file as the synthetic negative example, it is highly unlikely that the randomly selected media file is related to or otherwise responsive to the randomly selected search query and therefore would be a synthetic negative example for the search query. In certain aspects, prior to randomly selecting the media file from the collection 240 as the synthetic negative example, files that have been previously downloaded for the randomly selected search query can be temporarily removed from the collection 240 so as to ensure that the randomly selected media file is not one that has been previously downloaded in response to the search query.

As a second approach, the training media file can be identified for designation as a synthetic negative example for a search query by, for example, identifying a plurality of media files from the collection of media files 240 that were previously displayed on screen to a user in response to the search query, identifying at least one of the media files that was not engaged with by the user when it was previously displayed on screen to the user in response to the search query, and designating that media file as the training media file for designation as a synthetic negative example for the search query. For instance, a user previously searched for the term "red sports car" using a client device 110 using the search engine 242 and twenty-four images from the collection of media files 240 were loaded on a web page to display to the user's client device 110. Of those twenty-four images, twelve images were visible to the user on a display of the user's client device 110. Of those twelve images visible to the user, the user interacted with three of the images, namely the first, third, and eighth image, by, for example, scrolling a cursor over any of the three images to enlarge the image or selecting any of the three images for download. It can be inferred then that the user likely viewed each of the images up until the eighth image, and because the user did not interact with the second and fourth to seventh images the user likely did not find those images to be responsive to the search query. Accordingly, any of the second and fourth to seventh images can be identified for designation as a synthetic negative example for the search query.

As a third approach, and one that facilitates both the identification of synthetic negative examples and synthetic positive examples, the training media file can be identified for designation as a synthetic negative example for a search query by, for example, first identifying at least one actual positive media file example for the search query. Thereafter, using the actual positive media file example, a visual similarity threshold value can be determined to indicate whether another media file from the collection 240 is visually similar to the at least one positive example media file. A media file can be can be selected from the collection of media files 240 and designated as a synthetic negative example for the search query when a visual similarity value for the selected media file is below the visual similarity threshold value. Similarly, a media file can be can be selected from the collection of media files 240 and designated as a synthetic positive example for the search query when a visual similarity value for the selected media file exceeds the visual similarity threshold value. In certain aspects, media files that were previously interacted with in response to a search query are excluded from the collection of media files 240 prior to selection of the synthetic examples.

The visual similarity threshold value can be determined based on a visual similarity value calculated from a comparison of a first set of media files downloaded for the search query from the collection 240 during a first period of time to a second set of media files different than the first set of media files that were downloaded from the collection 240 for the search query during a second period of time. A visual similarity value can be calculated, for example, using a convolutional neural network, which can be a type of feed-forward artificial neural network where individual neurons are tiled in such a way that the individual neurons respond to overlapping regions in a visual field. The convolutional neural network can be, for example, AlexNet, GoogLeNet, or a Visual Geometry Group convolutional neural network. In certain aspects, the convolutional neural network consists of a stack of convolutional layers followed by several fully connected layers. The convolutional neural network can include a loss layer (e.g., softmax or hinge loss layer) to back propagate errors so that the convolutional neural network learns and adjusts its weights to better fit provided image data.

For example, the second period of time can be the previous thirty days, and the first period of time can be all time before the previous thirty days. Images from the collection of media files 240 that were downloaded in response to a search query "pine trees" during any time previous to the previous thirty days can be compared using the convolutional neural network to images newly added to the collection in the previous thirty days and downloaded in response to the search query "pine trees" in order to generate a visual similarity value that is designated as the visual similarity threshold value for the search query "pine trees". Any or all of these images that were downloaded from the collection 240 in response to the search query "pine trees" can be designated as an actual positive media file example for the search query "pine trees", or alternatively, the most downloaded image from the collection 240 in response to the search query "pine trees" can be designated as the actual positive media file example for the search query "pine trees". Other approaches may also be used to designate the actual positive media file example for the search query "pine trees".

Thereafter, images from the media collection having a visual similarity value that is below the visual similarity threshold value for "pine trees" when compared to the actual positive media file example for the search query "pine trees" can be designated as synthetic negative examples for the search query "pine trees", and images from the media collection having a visual similarity value that exceeds the visual similarity threshold value for "pine trees" when compared to the actual positive media file example for the search query "pine trees" can be designated as synthetic positive examples for the search query "pine trees".

In certain aspects, the visual similarity threshold value can be adjusted or otherwise determined based on a number of downloads of media files for the search query or a number of media files deemed synthetic positive or negative examples to the actual positive media file example for the search query based on the visual similarity threshold value. For example, a search query "Jones Street in New York" may be found to have eight synthetic positive examples when the visual similarity threshold value for the search query is "0.9", but thirty synthetic positive examples when the visual similarity threshold value for the search query is "0.85", and therefore the visual similarity threshold value for the search query "Jones Street in New York" may be set lower in order to identify a greater number of synthetic positive examples with which to train the supervised machine learned ranking algorithm 234. As another example, a search query "black suits at night" may be found to have three synthetic negative examples when the visual similarity threshold value for the search query is "0.6", but 1200 synthetic negative examples when the visual similarity threshold value for the search query is "0.85", and therefore the visual similarity threshold value for the search query "black suits at night" may be set higher in order to identify a greater number of synthetic negative examples with which to train the supervised machine learned ranking algorithm 234. As yet another example, a search query "oldest wheel in the world" may be found to have had seventy media files that were downloaded as responsive to the query, which may be considered a limited data set for identifying actual positive examples and therefore would require more stringent similarity in order for other media files to be considered visually similar to the actual positive examples. In this case, instead of having a visual similarity threshold value for the search query as "0.6" where 800 synthetic positive examples are identified, the visual similarity threshold value for the search query may be set higher to "0.97" where twelve synthetic positive examples are identified in order to provide a more accurate set of synthetic positive examples with which to train the supervised machine learned ranking algorithm 234. This may be in contrast to search queries such as "beach" where a greater number of synthetic positive examples are likely to be responsive to the search query "beach".

As a fourth approach, and another that facilitates both the identification of synthetic negative examples and synthetic positive examples, the training media file can be identified for designation as a synthetic negative example for a search query by, for example, the processor 236 being configured to first divide the collection of the media files 240 into clusters based on a similarity threshold. The number of clusters can be manually selected, such as, for example, designating that the collection of the media files 240 be divided into 1000 clusters. Media files from the collection 240 can be designated to belong to one of the clusters based on a similarity threshold using a clustering algorithm. The similarity threshold can indicate visual similarity, conceptual similarity, keyword similarity, or another measurement of similarity between media files.

The processor 236 is further configured to determine, for the search query, how many downloads occurred for the search query from each of the clusters of media files. For example, cluster #12 may be responsible for 32% of the media files that were downloaded from the collection 240 in response to the search query, and cluster #942 may be responsible for 2% of the media files that were downloaded from the collection 240 in response to the search query. The processor 236 is further configured to select at random a media file from the media files in one of the clusters that has a download count below a download frequency threshold value and designate the randomly selected media file for the cluster as the synthetic negative example for the search query. For example, if the download frequency threshold value is 3%, and cluster #942 is responsible for 2% of the media files that were downloaded from the collection 240 in response to the search query "pizza toppings", then a media file may be selected at random from cluster #942 and designated as the synthetic negative example for the search query "pizza toppings".

Similarly, the processor 236 is configured to select a synthetic positive example for a search query by selecting at random a media file from one of the clusters having a download count exceeding a download frequency threshold value. For example, if the download frequency threshold value is 98%, and cluster #266 is responsible for 99.6% of the media files that were downloaded from the collection 240 in response to the search query "construction paper projects", then a media file may be selected at random from cluster #266 and designated as the synthetic positive example for the search query "construction paper projects".

The processor 236 is further configured to provide a training set (not illustrated) to the supervised machine learned ranking algorithm 234 in order to generate a ranking model that provides a probability that a media file from the collection of media files 240 is responsive to the search query. The training set includes an identification of the search query, a copy of the at least one training media file, and a first indicator that the training media file is a synthetic negative example for the search query. In certain aspects where at least another training media file is identified as a synthetic positive example for the search query, then the training set can include a copy of the other training media file selected as the synthetic positive example for the search query and a second indicator that the other training media file is a synthetic positive example for the search query.

After the processor 236 provides the training set to the supervised machine learned ranking algorithm 234 in order to generate a ranking model, the supervised machine learned ranking algorithm 234 is considered trained. Subsequently, the processor 236, which is configured to provide the search query and the collection of media files 240 to the supervised machine learned ranking algorithm 234, will be configured to receive, from the supervised machine learned ranking algorithm 234, a ranking of the collection of media files 240 according to a probability that each media file in the collection 240 is responsive to the search query.

Thereafter, when the search engine 242 receives a search query from a client 110 over the network 150 and the received search query is one for which the supervised machine learned ranking algorithm 234 has been trained, then using the ranking model the server 232 is able to provide back to the client 110 over the network 150 a listing of media files responsive to the search query from the collection of media files 240 that are ranked based on a probability that the media files are responsive to the search query. The listing can be displayed as a web page including copies of the media files responsive to the search query.

Figure 3:
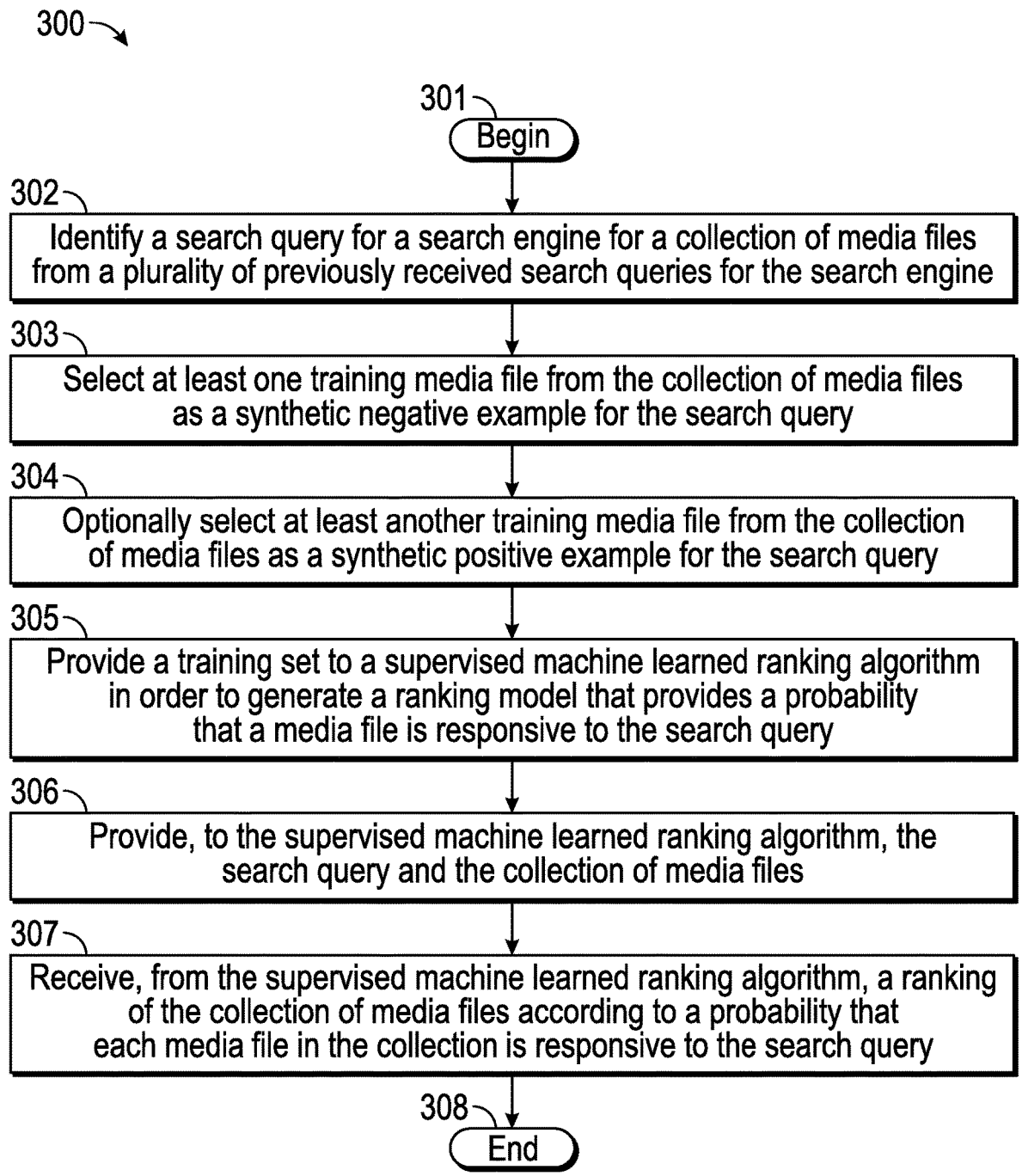
FIG. 3 illustrates an example process for providing information to a supervised machine learned ranking algorithm in order to generate a ranking model that provides a probability that a media file is responsive to a search query using an example server of FIG. 2.

FIG. 3 illustrates an example process 300 for providing information to a supervised machine learned ranking algorithm 234 in order to generate a ranking model that provides a probability that a media file is responsive to a search query using the example server 130 of FIG. 2. While FIG. 3 is described with reference to FIG. 2, it should be noted that the process steps of FIG. 3 may be performed by other systems.

The process 300 begins by proceeding from beginning step 301 to step 302 when a search query is identified for a search interface for the collection of media files 240 from a plurality of previously received search queries for the search engine 242. Next, in step 303, at least one training media file is selected from the collection of media 240 files as a synthetic negative example for the search query, and in optional step 304 at least another training media file is selected from the collection of media files 240 as a synthetic positive example for the search query. Subsequently in step 305 a training set is provided to a supervised machine learned ranking algorithm 234 in order to generate a ranking model that provides a probability that a media file is responsive to the search query. In step 306, the search query and the collection of media files 240 are provided to the supervised machine learned ranking algorithm 234, and in step 307 a ranking of the collection of media files 240 according to a probability that each media file in the collection is responsive to the search query is received from the supervised machine learned ranking algorithm 307. The process 300 then ends in step 308.

Figure 4:
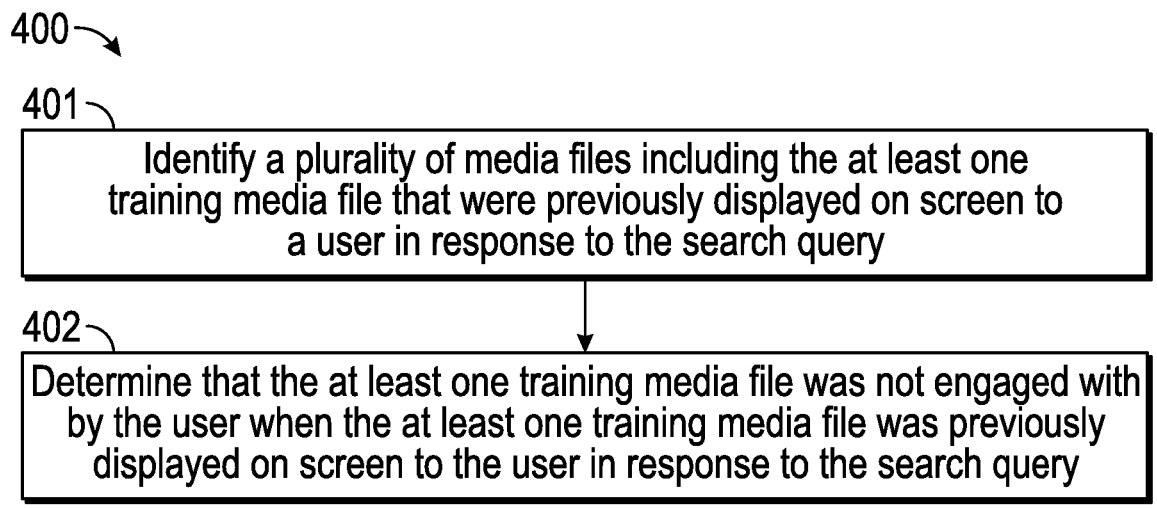
FIG. 4 illustrates a first example process for identifying synthetic negative media file examples to train the supervised machine learned ranking algorithm of the example process of FIG. 3.

FIG. 4 illustrates a first example process 400 for identifying synthetic negative media file examples to train the supervised machine learned ranking algorithm 234 of the example process of FIG. 3. The process 400 includes identifying a plurality of media files including the at least one training media file that were previously displayed on screen to a user in response to the search query in step 401, and determining that the at least one training media file was not engaged with by the user when the at least one training media file was previously displayed on screen to the user in response to the search query in step 402.

Figure 5:
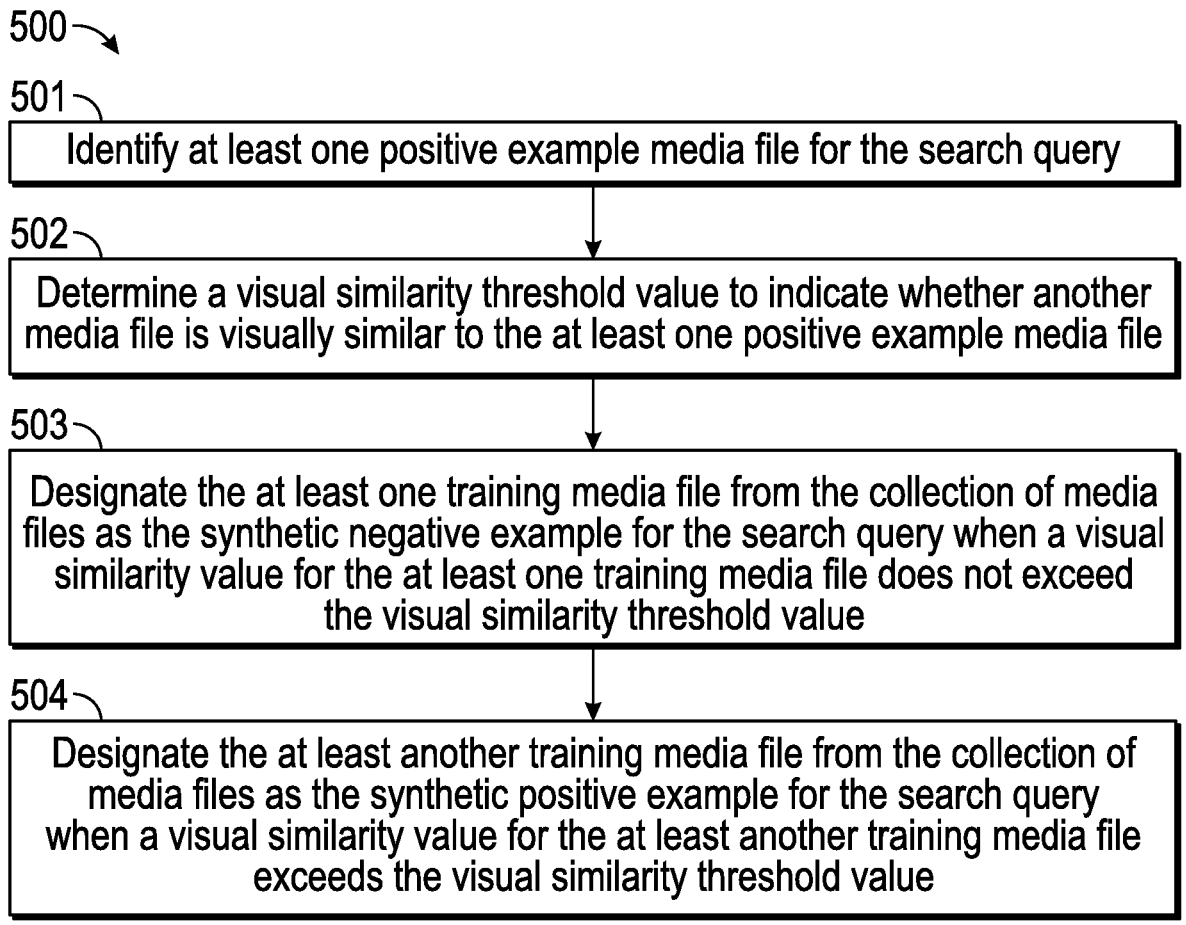
FIG. 5 illustrates a second example process for identifying synthetic negative media file examples and optionally synthetic positive media file examples to train the supervised machine learned ranking algorithm of the example process of FIG. 3.

FIG. 5 illustrates a second example process 500 for identifying synthetic negative media file examples and optionally synthetic positive media file examples to train the supervised machine learned ranking algorithm 234 of the example process of FIG. 3. The process 500 includes identifying at least one positive example media file for the search query in step 501, and determining a visual similarity threshold value to indicate whether another media file is visually similar to the at least one positive example media file in step 502. Thereafter in step 503 the at least one training media file from the collection of media files is designated as the synthetic negative example for the search query when a visual similarity value for the at least one training media file does not exceed the visual similarity threshold value, and in step 504 the at least another training media file from the collection of media files is designated as the synthetic positive example for the search query when a visual similarity value for the at least another training media file exceeds the visual similarity threshold value.

Figure 6:
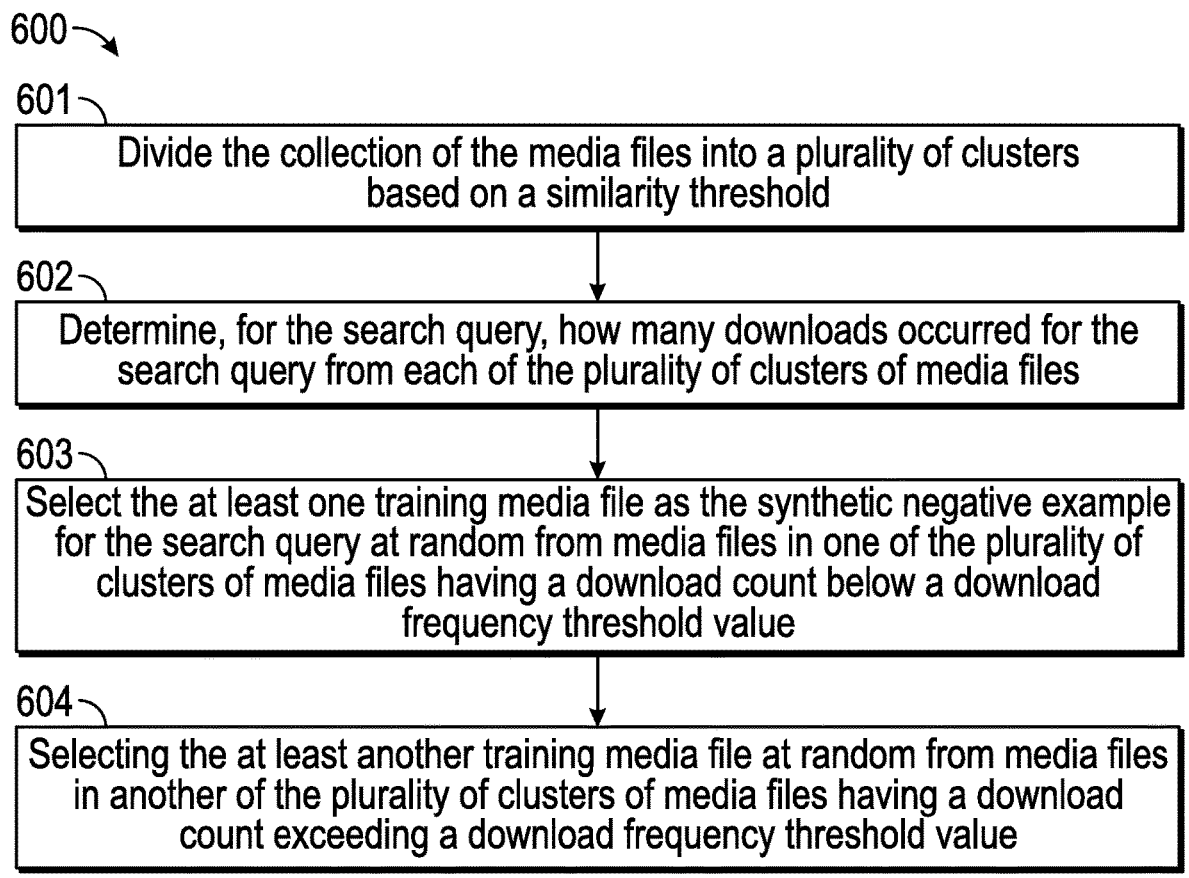
FIG. 6 illustrates a third example process for identifying synthetic negative media file examples and optionally synthetic positive media file examples to train the supervised machine learned ranking algorithm of the example process of FIG. 3.

FIG. 6 illustrates a third example process 600 for identifying synthetic negative media file examples and optionally synthetic positive media file examples to train the supervised machine learned ranking algorithm 234 of the example process of FIG. 3. In step 601 the collection of the media files 240 is divided into a plurality of clusters based on a similarity threshold, and in step 602 the number of downloads that occurred for the search query from each of the plurality of clusters of media files is determined. In step 603 the at least one training media file is selected as the synthetic negative example for the search query at random from media files in one of the plurality of clusters of media files having a download count below a download frequency threshold value, and in step 604 the at least another training media file is selected at random from media files in another of the plurality of clusters of media files having a download count exceeding a download frequency threshold value.

FIG. 3 set forth an example process 300 for providing information to a supervised machine learned ranking algorithm 234 in order to generate a ranking model that provides a probability that a media file is responsive to a search query using the example server 130 of FIG. 2 using the example server 130 of FIG. 2. An example will now be described using the example process 300 of FIG. 3 and a search query for "cats", and the example process 500 of FIG. 5 for identifying synthetic negative media file examples for the search query "cats" and synthetic positive media file examples for the search query "cats" to train the supervised machine learned ranking algorithm 234 of the example process of FIG. 3.

The process 300 begins by proceeding from beginning step 301 to step 302 when a search query for "cats" is identified for a search interface for the collection of media files 240 (that includes over ten million images and videos) from previously received search queries that the search engine 242 has processed. Next, in step 303, at least one training media file, namely an image of a boat, is selected from the collection of media 240 files as a synthetic negative example for the search query, and in optional step 304 at least another training media file, namely an image of a brown cat, is selected from the collection of media files 240 as a synthetic positive example for the search query "cats".

The training media file, the image of the boat, is identified for designation as a synthetic negative example for a search query by first identifying at least one actual positive media file example for the search query, the actual positive media file being an image of an orange cat that was previously downloaded by a user in response to a previous submission of the search query "cats". Thereafter, using the actual positive media file example of the image of the orange cat, a visual similarity threshold value is determined to indicate whether another media file from the collection 240 is visually similar to the at least one positive example media file, the image of the orange cat.

The visual similarity threshold value is determined to be 0.96 based on a visual similarity value calculated using a convolutional neural network as 0.96 from a comparison of a first set of media files, namely images of cats, downloaded for the search query "cats" from the collection 240 during the past twelve months, with the exclusion of the previous month, to a second set of media files, namely other images of cats, that were added to and downloaded from the collection 240 for the search query "cats" during the past month.

The training media file, namely the image of the boat, was selected from the collection of media files 240 and designated as a synthetic negative example for the search query because the visual similarity value for the image of the boat is below the visual similarity threshold value of 0.96. The other training media file, namely the image of a brown cat, was selected from the collection of media files 240 and designated as a synthetic positive example for the search query because the visual similarity value for image of the brown cat was 0.98, which exceeds the visual similarity threshold value of 0.96.

Figure 7:
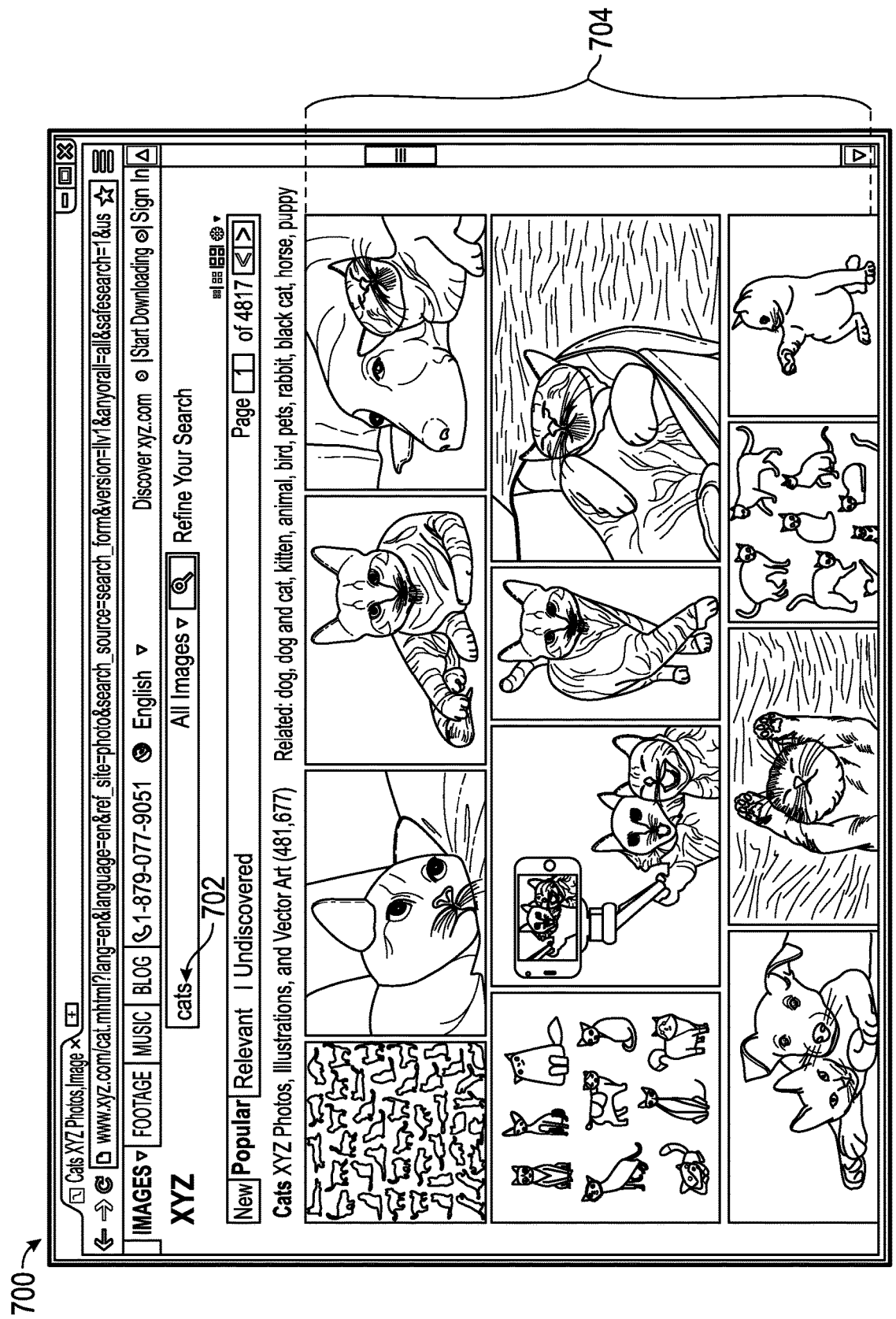
FIG. 7 is an example illustration of an interface display media files responsive to a search query that are displayed according to the ranking model of the process of FIG. 3.

Returning to the process 300, subsequently in step 305 a training set is provided to a supervised machine learned ranking algorithm 234 in order to generate a ranking model that provides a probability that a media file to be processed by the supervised machine learned ranking algorithm 234 is responsive to the search query for "cats". The training set includes an identification of the search query "cats", a copy of the training image file of the boat, a first indicator that the training image file of the boat is a synthetic negative example for the search query "cats", a copy of the other training image file of the brown cat, and a second indicator that the other training image file of the brown cat is a synthetic positive example for the search query "cats". In certain aspects, the training set can also include actual positive examples. In step 306, a newly received search request received by a user using a client device 110 for the search query "cats" is received by the server 130, and the search query "cats" and the collection of media files 240 are provided to the supervised machine learned ranking algorithm 234, and in step 307 a ranking of the collection of media files 240 according to a probability that each media file in the collection is responsive to the search query "cats" is received from the supervised machine learned ranking algorithm 307. The ranking of the collection of media files 240 ranks images of cats as most relevant to the search query "cats" and the server 130 provides copies of the highest ranked of those images to the client 110 for display to the user. FIG. 7 is an example illustration of an interface 700 displaying media files responsive to a search query that are displayed according to the ranking model of the process of FIG. 3. The interface 7000 includes an identification of the search query "cats" 702, and a display of the media files 704 ranked as most responsive to the search query "cats" The process 300 then ends in step 308.

Figure 8:
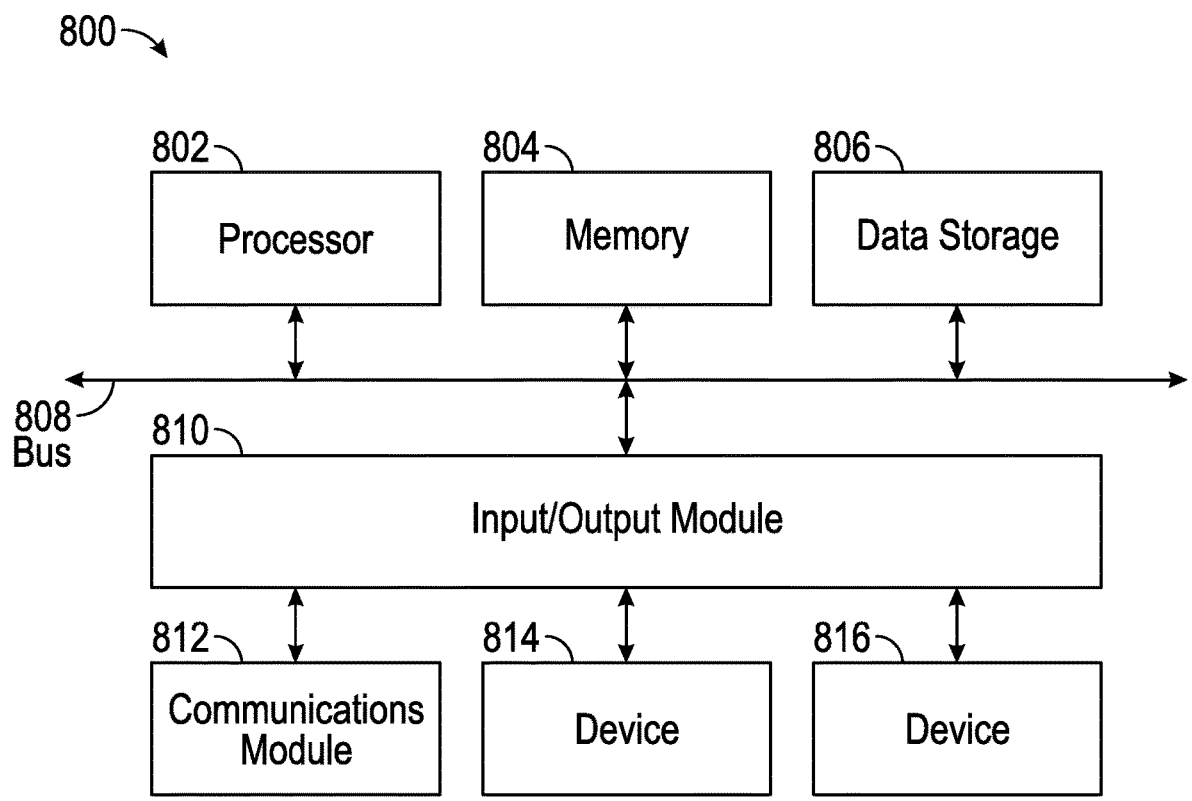
FIG. 8 is a block diagram illustrating an example computer system with which the server of FIG. 2 can be implemented.

FIG. 8 is a block diagram illustrating an example computer system 800 with which the server 130 of FIG. 2 can be implemented. In certain aspects, the computer system 800 may be implemented using hardware or a combination of software and hardware, either in a dedicated server, or integrated into another entity, or distributed across multiple entities.

Computer system 800 (e.g., server 130) includes a bus 808 or other communication mechanism for communicating information, and a processor 802 (e.g., processor 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 (e.g., communications module 238) include networking interface cards, such as Ethernet cards and modems. In certain aspects, the input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as a CRT (cathode ray tube) or LCD (liquid crystal display) monitor, for displaying information to the user.

According to one aspect of the present disclosure, the server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for identifying synthetic media file examples to train a supervised machine learned ranking algorithm to rank relevance of media files to a search query, the method comprising:
   identifying a search query for a search engine for a collection of media files from a plurality of previously received search queries for the search engine;
   determining a similarity threshold value based on a distance calculation between media files;
   identifying a cluster of similar media files within the similarity threshold value;
   selecting a negative cluster from the cluster of similar media files having a frequency of downloads associated with the search query for the media files that is below a download threshold value;
   selecting at least one training media file, at random, from the negative cluster as a synthetic negative example related to the search query based at least on at least one training media file having a frequency of downloads below the download threshold value;
   providing, to a supervised machine learned ranking algorithm in order to generate a ranking model that provides a probability that a media file is responsive to the search query, a training set comprising:
      an identification of the search query,
      a copy of the at least one training media file, and
      a first indicator that the at least one training media file is a synthetic negative example for the search query;
   providing, to the supervised machine learned ranking algorithm, the search query and the collection of media files; and
   receiving, from the supervised machine learned ranking algorithm, a ranking of the collection of media files according to a probability that each media file is responsive to the search query.

2. The computer-implemented method of claim 1, wherein the ranking model is a logistic regression model.

3. The computer-implemented method of claim 1,
   wherein the identifying the search query comprises selecting the search query at random from the plurality of previously received search queries for the search engine, and
   wherein selecting the at least one training media file from the collection of media files as the synthetic negative example for the search query comprises:
      selecting at random the at least one training media file from the collection of media files and designating the at least one training media file as a synthetic negative example.

4. The computer-implemented method of claim 3, wherein the collection of media files excludes files that have been previously downloaded for the search query.

5. The computer-implemented method of claim 1, wherein selecting the at least one training media file from the collection of media files as the synthetic negative example for the search query comprises:
   identifying a plurality of media files, comprising the at least one training media file, that were previously displayed on screen to a user in response to the search query; and
   determining that the at least one training media file was not engaged with by the user when the at least one training media file was previously displayed on screen to the user in response to the search query.

6. The computer-implemented method of claim 1, wherein selecting the at least one training media file from the collection of media files as the synthetic negative example for the search query comprises:
   identifying at least one positive example media file for the search query;
   determining a visual similarity threshold value to indicate whether another media file is visually similar to the at least one positive example media file; and
   designating the at least one training media file from the collection of media files as the synthetic negative example for the search query when a visual similarity value for the at least one training media file does not exceed the visual similarity threshold value.

7. The computer-implemented method of claim 6, further comprising: selecting at least another training media file from the collection of media files as a synthetic positive example for the search query,
   wherein the training set further comprises a copy of the at least another training media file selected as the synthetic positive example for the search query and a second indicator that the at least another training media file is a synthetic positive example for the search query.

8. The computer-implemented method of claim 7, wherein selecting the at least another training media file from the collection of media files as a synthetic positive example for the search query comprises designating the at least another training media file from the collection of media files as the synthetic positive example for the search query when a visual similarity value for the at least another training media file exceeds the visual similarity threshold value.

9. The computer-implemented method of claim 8, wherein the at least one training media file and the at least another training media file have not previously been downloaded by a user in response to the search query.

10. The computer-implemented method of claim 6, wherein the visual similarity threshold value is determined based on a visual similarity value calculated from a comparison of a first set of media files downloaded for the search query during a first period of time to a second set of media files different than the first set of media files that were downloaded for the search query during a second period of time.

11. The computer-implemented method of claim 6, wherein the visual similarity threshold value is determined based on a number of downloads of media files for the search query.

12. A system for identifying synthetic media file examples to train a supervised machine learned ranking algorithm to rank relevance of media files to a search query, the system comprising:
   a memory comprising:
      a supervised machine learned ranking algorithm, and a collection of media files; and
   a processor configured to execute instructions to:
      identify a search query for a search engine for the collection of media files from a plurality of previously received search queries for the search engine;
      determine a similarity threshold value based on a distance calculation between media files;
      identify a cluster of similar media files within the similarity threshold value;
      select a negative cluster from the cluster of similar media files having a frequency of downloads associated with the search query for the media files that is below a download threshold value;
      select at least one training media file, at random, from the negative cluster as a synthetic negative example related to the search query based at least on at least one training media file having a frequency of downloads below the download threshold value;
      select at least another training media file from the collection of media files as a synthetic positive example for the search query;
      provide, to the supervised machine learned ranking algorithm in order to generate a logistic regression model that provides a probability that a media file is responsive to the search query, a training set comprising:
         an identification of the search query,
         a copy of the at least one training media file,
         a first indicator that the at least one training media file is a synthetic negative example for the search query,
         a copy of the at least another training media file selected as the synthetic positive example for the search query, and
         a second indicator that the at least another training media file is a synthetic positive example for the search query;
      provide, to the supervised machine learned ranking algorithm, the search query and the collection of media files; and
      receive, from the supervised machine learned ranking algorithm, a ranking of the collection of media files according to a probability that each media file is responsive to the search query.

13. The system of claim 12,
   wherein the processor being configured to identify the search query comprises the processor being configured to select the search query at random from the plurality of previously received search queries for the search engine,
   wherein the processor being configured to select the at least one training media file from the collection of media files as the synthetic negative example for the search query comprises the processor being configured to select at random the at least one training media file from the collection of media files and designating the at least one training media file as a synthetic negative example, and
   wherein the collection of media files excludes files that have been previously downloaded for the search query.

14. The system of claim 12, wherein the processor being configured to select the at least one training media file from the collection of media files as the synthetic negative example for the search query comprises the processor being configured to:
   identify a plurality of media files, comprising the at least one training media file, that were previously displayed on screen to a user in response to the search query; and
   determine that the at least one training media file was not engaged with by the user when the at least one training media file was previously displayed on screen to the user in response to the search query.

15. The system of claim 12, wherein the processor being configured to select the at least one training media file from the collection of media files as the synthetic negative example for the search query comprises the processor being configured to:
   identify at least one positive example media file for the search query; determine a visual similarity threshold value to indicate whether another media file is visually similar to the at least one positive example media file; and designate the at least one training media file from the collection of media files as the synthetic negative example for the search query when a visual similarity value for the at least one training media file does not exceed the visual similarity threshold value,
   wherein the processor being configured to select the at least another training media file from the collection of media files as the synthetic positive example for the search query comprises the processor being configured to designate the at least another training media file from the collection of media files as the synthetic positive example for the search query when a visual similarity value for the at least another training media file exceeds the visual similarity threshold value, and
   wherein the at least one training media file and the at least another training media file have not previously been downloaded by a user in response to the search query.

16. The system of claim 15, wherein the visual similarity threshold value is determined based on at least one of a visual similarity value calculated from a comparison of a first set of media files downloaded for the search query during a first period of time to a second set of media files different than the first set of media files that were downloaded for the search query during a second period of time, or a number of downloads of media files for the search query.

17. The system of claim 12, the processor being configured to: divide the collection of media files into a plurality of clusters based on a similarity threshold;
   determine, for the search query, how many downloads occurred for the search query from each of the plurality of clusters of media files;
   select the at least one training media file as the synthetic negative example for the search query at random from media files in one of the plurality of clusters of media files having a download count below a download frequency threshold value; and
   select the at least another training media file as the synthetic positive example for the search query at random from media files in another of the plurality of clusters of media files having a download count exceeding a download frequency threshold value.

18. A non-transitory machine-readable storage medium comprising machine-readable instructions for causing a processor to execute a method for identifying synthetic media file examples to train a supervised machine learned ranking algorithm to rank relevance of media files to a search query, comprising:

identifying a search query for a search engine for a collection of media files from a plurality of previously received search queries for the search engine;

determining a similarity threshold value based on a distance calculation between media files;

identifying a cluster of similar media files within the similarity threshold value;

selecting a negative cluster from the cluster of similar media files having a frequency of downloads associated with the search query for the media files that is below a download threshold value;

selecting at least one training media file, at random, from the negative cluster as a synthetic negative example related to the search query based at least on at least one training media file having a frequency of downloads below the download threshold value;

selecting at least another training media file from the collection of media files as a synthetic positive example for the search query;

providing, to a supervised machine learned ranking algorithm in order to generate a logistic regression model that provides a probability that a media file is responsive to the search query, a training set comprising:

an identification of the search query, a copy of the at least one training media file, a first indicator that the at least one training media file is a synthetic negative example for the search query, a copy of the at least another training media file selected as the synthetic positive example for the search query, and a second indicator that the at least another training media file is a synthetic positive example for the search query;

providing, to the supervised machine learned ranking algorithm, the search query and the collection of media files; and receiving, from the supervised machine learned ranking algorithm, a ranking of the collection of media files according to a probability that each media file is responsive to the search query.

* * * * *